(12) United States Patent
Wang et al.

(10) Patent No.: US 10,354,692 B2
(45) Date of Patent: Jul. 16, 2019

(54) GAPLESS VIDEO LOOPING

(71) Applicant: Twitter, Inc., San Francisco, CA (US)

(72) Inventors: Zhong Sheng Wang, New York, NY (US); Ryan Matthew Gordon, New York, NY (US)

(73) Assignee: Twitter, Inc., San Francisco, CA (US)

( * ) Notice: Subject to any disclaimer, the term of this patent is extended or adjusted under 35 U.S.C. 154(b) by 87 days.

(21) Appl. No.: 15/284,317

(22) Filed: Oct. 3, 2016

(65) Prior Publication Data

US 2017/0098464 A1 Apr. 6, 2017

Related U.S. Application Data (60) Provisional application No. 62/236,615, filed on Oct. 2, 2015.

(51) Int. Cl.
| | |
|---|---|
| *G11B 27/031* | (2006.01) |
| *H04N 21/41* | (2011.01) |
| *H04N 21/43* | (2011.01) |
| *H04N 21/432* | (2011.01) |
| *H04N 21/439* | (2011.01) |
| *H04N 21/44* | (2011.01) |
| *H04N 21/845* | (2011.01) |
| *H04N 21/8547* | (2011.01) |

(Continued)

(52) U.S. Cl.
CPC ............ *G11B 27/007* (2013.01); *G11B 27/00* (2013.01); *G11B 27/031* (2013.01); *G11B 27/34* (2013.01); *H04L 51/32* (2013.01); *H04L 65/601* (2013.01); *H04N 21/4126* (2013.01); *H04N 21/4307* (2013.01); *H04N 21/4325* (2013.01); *H04N 21/4392* (2013.01); *H04N 21/44004* (2013.01); *H04N 21/44016* (2013.01); *H04N 21/8456* (2013.01); *H04N 21/8547* (2013.01)

(58) Field of Classification Search
CPC ..... G11B 27/007; G11B 27/031; G11B 27/34; H04L 51/32; H04L 65/601
See application file for complete search history.

(56) References Cited

U.S. PATENT DOCUMENTS

| | | | |
|---|---|---|---|
| 6,229,851 B1 | 5/2001 | Cotton | |
| 9,633,692 B1* | 4/2017 | Haselwander | ....... G11B 27/007 |

(Continued)

FOREIGN PATENT DOCUMENTS

WO 2013158804 A1 10/2013

OTHER PUBLICATIONS

International Search Report and Written Opinion for PCT Application No. PCT/US2016/55205, dated Dec. 2, 2016, 15 pages.

(Continued)

*Primary Examiner* — Gelek W Topgyal
(74) *Attorney, Agent, or Firm* — Brake Hughes Bellermann LLP (57) ABSTRACT

Techniques of playing back a looping video file involve providing multiple video codecs for decoding a video file. Each video codec performs its own decoding operation on the looping video file, resulting in multiple buffers of video frames and a buffer of audio frames. Then, as the GPU renders the ending video frames from a first buffer, it begins rendering the beginning video frames from a second buffer. In this way, the beginning of a next video cycle is already rendered for viewing by the time a current video cycle is ending.

20 Claims, 4 Drawing Sheets

(51) Int. Cl.
  *G11B 27/00*    (2006.01)
  *G11B 27/34*    (2006.01)
  *H04L 12/58*    (2006.01)
  *H04L 29/06*    (2006.01)

(56) References Cited

U.S. PATENT DOCUMENTS

| | | | |
|---|---|---|---|
| 9,686,524 B1* | 6/2017 | Hundemer | H04N 9/87 |
| 2007/0006060 A1 | 1/2007 | Walker et al. | |
| 2012/0170772 A1* | 7/2012 | Zheng | G11B 20/10527 |
| | | | 381/107 |
| 2014/0118477 A1* | 5/2014 | Dodd | H04N 7/15 |
| | | | 348/14.13 |

OTHER PUBLICATIONS

Sevilla-Lara, et al., "Smooth Loops from Unconstrained Video", Computer Graphics Forum, vol. 34, No. 4, 2015, 9 pages.

\* cited by examiner

GAPLESS VIDEO LOOPING

RELATED APPLICATION

This application is a non-provisional of, and claims priority to, U.S. Provisional Application No. 62/236,615, filed on Oct. 2, 2015, entitled "Gapless Video Looping," the disclosure of which is incorporated herein in its entirety.

TECHNICAL FIELD

This description relates to generation of looping audio visual files for social media sharing.

BACKGROUND

Audio and video edit programs can be used to produce a file that includes both audio content and video content for, for example, social media sharing. These files can be looped during playback, but may not have audio content that matches with the video content. In addition, the audio content may be truncated in a fashion that makes the audio content undesirable for social media sharing.

SUMMARY

Improved techniques of playing back a looping video file involve performing multiple decoding operations on the looping video file to produce multiple buffers of video frames and a buffer of audio frames. Then, as the graphics processing unit (GPU) renders the ending video frames from a first buffer, the GPU begins rendering the beginning video frames from a second buffer.

In one general aspect, playing back a looping video file can include performing, by processing circuitry of a computer, (i) a first file decoding operation on the video looping file to produce a first plurality of video frames and a plurality of audio frames and (ii) a second file decoding operation on the video looping file to produce a second plurality of video frames, each of the plurality of audio frames providing audio for a respective video frame of the first plurality of video frames and the second plurality of video frames. The method can also include rendering, by the processing circuitry, (i) the first plurality of video frames to produce first video content, the first video content having a beginning portion and an end portion and (ii) the plurality of the audio frames to produce audio content, the audio content including beginning audio samples corresponding to the beginning portion of the first video content and end audio samples corresponding to the end portion of the first video content. The method can further include displaying, by the processing circuitry, the end portion of the first video content. The method can further include, while the end portion of the first video content is displayed, rendering, by the processing circuitry, the second plurality of video frames, the second video content having a beginning portion and an end portion. The method can further include displaying, by the processing circuitry, the beginning portion of the second video content. The method can further include, while the beginning portion of the second video content is displayed, outputting, by the processing circuitry, the beginning audio samples and the end audio samples, thereby enabling the looping video file to be played back in a smooth loop.

Note that a smooth loop is a video loop in which a human viewer is not able to discern any discontinuous transitions. The human brain interprets video frames (e.g., video frames at a frame rate of 30 frame per second (fps)) as a continuous flow of action, so long as the frames are shown in the sequence in which they are filmed. A gap in a video sequence, such as the inclusion of more than two video frames that do not include video content may be detected by a human viewer. In conventional techniques of playing back a looping video file, there may be a latency in rendering the beginning frames of the file after the end frames have played. This latency results in a gap (e.g., a gap of more than two frames without video content) in the video that distracts the viewer from a smooth and continuous viewing experience a looping video is intended to provide.

Playing back a looping video file according to the improved techniques has advantages over conventional techniques. For example, the beginning of a next video loop is already rendered for viewing by the time a current video loop is ending. This ability to render the beginning of a loop ahead of time eliminates latencies experienced in the conventional techniques. The elimination of such latencies provide for looping video without any distracting gaps in the video that compromise the viewing experience, because there is a smooth transition between the end of one loop and the beginning of the next loop.

The details of one or more implementations are set forth in the accompanying drawings and the description below. Other features will be apparent from the description and drawings, and from the claims.

DETAILED DESCRIPTION

Seamless (also can be referred to as smooth or gapless) video looping can be at the core of many social media sharing applications, but playback with seamless video looping may not be supported natively (e.g., supported with minimal computational overhead, supported as part of an operating system) on certain media device platforms. This is in contrast to other media device platforms where gapless looping can be natively supported (at least in part).

For example, in platforms that do not support looping natively, there is a finite amount of time needed for video frames at the beginning of a loop to be reloaded into the cache of a graphics processing unit (GPU) for display on a mobile device. Thus, by the time the video is played to the end of a cycle of the video loop, the GPU begins to re-render the beginning video frames and load the resulting content into cache for display. Because this process can take some milliseconds, there may be a gap in the video loop noticeable to the viewer. For example, in some implementations, the gap between the end of a first cycle of the video loop and a beginning of a second cycle of the video loop can have a duration of at least two video frames. In some implementations, for example, the gap can be as little as 1 frame at a frame rate of 24 fps, which can be noticeable to a viewer. In some implementations, the gap can include frames without content. In some implementations, the gap can include frames that are repeated (e.g., repeated so that movement is paused). In some implementations, the gap can include frames that are produced by the GPU during processing between video loop cycles.

Some video players may not be configured to perform gapless playback on single/multiple videos. Some video players can be configured to playback a video loop in a looping fashion by using a custom sample class, but may not be configured to have two (or more) media codec (e.g., MediaCodec) instances for video rendering. Accordingly, when the first few frames of the video loop are re-processed the video player may wait until the first few frames are rendered before playing the next cycle of the video loop, resulting in a gap between video loops.

In contrast to the above-described player that is not capable of gapless video playback of a looping video file, improved techniques involve performing multiple decoding operations on the looping video file to produce multiple buffers of video frames and a buffer of audio frames. Then, as the GPU renders the ending video frames from a first buffer, it begins rendering the beginning video frames from a second buffer.

In some implementations, a gapless video player according to the improved techniques may also perform a trimming operation on decoded video frames of a video loop. For example, prior to rendering the video frames of the video loop, the video player may cause processing circuitry of the mobile device to remove video frames from an end portion of frames in a first buffer and video frames from a beginning portion of frames from a second buffer. Such a trimming operation may remove about 50 milliseconds, 75 milliseconds, 100 milliseconds, or more from the duration of the video. In doing so, the video player may further smoothen the transition between play cycles of a video loop.

In some implementations, such a gapless video player may adjust timestamps assigned to audio samples of rendered audio content associated with a video loop according to the results of the trimming operation. For example, some trimmed frames of a video loop do not have any corresponding audio. Thus, when video frames are trimmed, the audio timestamps may be reassigned to other portions of the video loop to account for the change in time due to processing delay between cycles of the video loop. Further, because there may be an overlap in video at the end and the beginning of a play cycle of the video loop, the timestamps assigned to the audio samples may be stretched out in time over this overlap portion (e.g., overlap of an end of a first cycle of the video loop and a beginning of a second cycle of the video loop).

In some implementations, a gapless video player according to the improved techniques may also perform a cross-fading operation by decreasing a volume of samples of audio at the end of a current play cycle of a video loop and increase the volume of samples of audio at the beginning of the next play cycle, i.e., over an overlap portion in time. In this way, the video player may further smoothen the transition between play cycles of the video loop. In some further implementations, the volume profile that results from the cross-fading operation takes the form of a sum of (i) a product of a minimum volume of the beginning audio samples and a monotonically increasing function of a fraction of the beginning portion of the second video content of a video loop displayed and (ii) a product of a maximum volume of the end audio samples and an inverse of the monotonically increasing function of the fraction of the beginning portion of the second video content of the video loop displayed.

Figure 1:
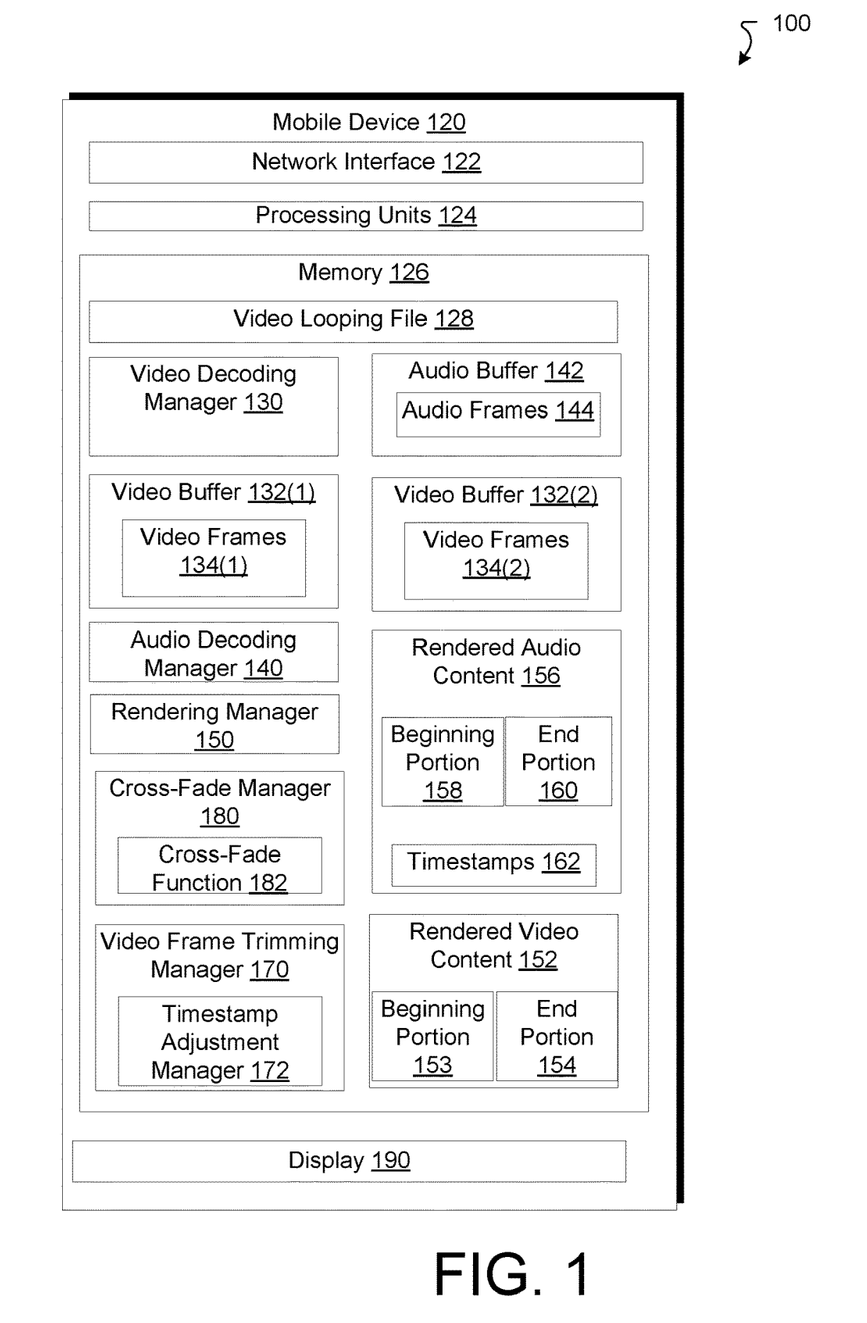
FIG. 1 is a diagram that illustrates an example electronic environment according to an implementation of improved techniques described herein.

FIG. 1 is a diagram that illustrates an example electronic environment 100 in which the above-described improved techniques may be implemented. As shown, in FIG. 1, the example electronic environment 100 includes a mobile device 120.

Some platforms (e.g., operating system platforms) of some mobile devices such as mobile device 120 can be modified to include gapless looping playback of audio-visual content (also can be referred to as video content).

Components of a gapless video player according to the improved techniques described herein and as depicted in FIG. 1 include a video decoding manager 130, an audio decoding manager 140, a rendering manager 150, a video frame trimming manager 170, and a cross-fade manager 180.

The video decoding manager 130 is configured to provide codecs for decoding the video looping file to produce sets of video frames 134(1) and 134(2), each stored in respective video buffer 132(1) and 132(2) in memory 126. For example, when the video looping file 128 provides MP4 video, the video decoding manager 130 obtains a codec for decompressing video that is compressed in the MP4 format from memory 126. The video decoding manager 130 also causes processing units 124 to use decoding algorithms from the MP4 codecs stored in the memory 126. These decoding algorithms from a codec decompress the video content in the video looping file 128 and store resulting video frames 134(1) in the buffer 132(1). Similarly, decoding algorithms from the codec decompress the video content in the looping video file 128 and store the resulting frames 134(2) in the buffer 132(2). It should be noted, however, that typically, some frames may be too large to store locally and rather the frames 134(1) and 134(2) may actually be pointers to frames stored externally.

The audio decoding manager 140 is configured to provide a codec for decoding audio provided in the video looping file 128 to produce a set of audio frames 144 stored in the audio buffer 142. For example, the audio decoding manager 140 obtains a codec for decompressing audio that is compressed in an AAC format from memory 126.

In some implementations, a duration of one loop, or cycle, of the video content corresponds to an amount of audio that may be stored in a single buffer in the memory of a mobile device, e.g., a duration of about 6 seconds, a duration of about 6.5 seconds, a duration of about 7 seconds.

The rendering manager 150 is configured to render video frames 134(1) and 134(2) to form rendered video content 152 for the display 190. The rendering manager 150 is further configured to store rendered video content 152 in a cache of a processing unit 124, e.g., a GPU, according to a sequence defined by the timestamps 162. The rendered video content 152 has a beginning portion 154 and an end portion 156 corresponding to the beginning and end portions 146 and 148 of the audio frames 144.

The rendering manager 150 is also configured to render audio frames 144 to produce rendered audio content 156. For example, the rendering manager 150 stores each audio sample as a 16-bit integer in memory 126 as the rendered audio content 156. Each audio frame, when rendered, includes multiple audio samples depending on a sample rate. For example, if the sample rate of the audio is 48 kHz and there are 30 frames per second, then there are 1600 audio samples per frame.

The rendered audio content 156 has a beginning portion 146 and an end portion 148. Each of the beginning portion 146 and the end portion 148 represents a few audio frames, e.g., about 50-200 milliseconds of audio at either end of the loop. Further, each audio sample has a timestamp 162 indicating a time at which the sample is to be played within an audio frame.

In some implementations, the rendered audio content 156 is synchronized to the rendered video content 152. In some implementations, the rendered audio content 156 is not synchronized to the rendered video content 152. For example, some video looping files include video frames (e.g., at the beginning of a loop) that do not contain any audio. In such cases, such video frames may be trimmed from the video loop. Synchronization may be tracked using timestamps 162. In some implementations, the timestamps 162 track each audio sample within an audio frame. In other arrangements, the timestamps 162 track individual audio frames.

The video frame trimming manager 170 is configured to perform trimming operations on the video frames 134(1) and 134(2), i.e., remove some video frames 134(2) corresponding to the beginning of the video loop and/or remove some video frames 134(1) corresponding to the end of the video loop. The video trimming manager 170 also includes a timestamp adjustment manager 172 that adjusts timestamps of audio samples in the beginning portion 158 and/or the end portion 160.

The cross-fade manager 180 is configured to perform a cross-fade operation on the audio samples at the beginning portion 158 after a first loop. The cross-fade manager 180 mixes in a first audio sample in the beginning portion 158 and fades out a second audio sample from the end portion 160. In some implementations, the volume of the first and second audio sample in the beginning portion 158 is given by a cross-fade function 182:

$$v_b f(x) + v_e f(1-x),$$

where $v_b$ is the minimum volume at the beginning of audio samples at the beginning portion 158, $v_e$ is the maximum volume of audio samples at the end portion 160, x is fraction of the beginning portion 158 over time, i.e., from 0 to 100 milliseconds, and $f$ is a monotonically increasing function.

To support seamless looping videos, a gapless video player can be defined with characteristics for seamless video looping because certain video players in some device platforms do not support seamless video playback (e.g., do not support seamless video playback with audio effects in between).

In some implementations, the gapless video player can include the following components (listed in an arbitrary order):

1. A file decoder, e.g., decoding managers 130 and 140 that decode video files (e.g., MP4 video files) into audio samples and video frames;
2. A decoder that decodes audio samples;
3. A decoder that decodes video frames into images;
4. A video renderer, e.g., rendering manager 150 that renders video frames onto a texture (e.g., a SurfaceTexture);
5. An audio renderer, e.g., rendering manager 150 that renders audio samples onto an audio track (e.g., AudioTrack);
6. A player, e.g., timestamp adjustment manager 172 that handles A/V sync issues; and
7. A view (e.g., View) that can handle what is rendered by the video renderer In some implementations, the gapless video player can include audio rendering. In order to achieve gapless video playback, a decoded version of the beginning of the audio track can be cached, e.g., with rendered audio content 156. When the decoded version of the end of the audio track has been obtained, the two segments can be used to execute looping.

In some implementations, the gapless video player can include video rendering, e.g. by rendering manager 150. In order to make the video frames loop with the audio, timestamps 162 can be adjusted, and a media codec instance can be waiting (e.g., ready to render the next frame immediately). Accordingly, multiple textures (e.g., SurfaceTextures in video buffers 132(1) and 132(2)) can be maintained since each texture may only bind to a single producer.

In some implementations, a gapless video player according to the above-described improved techniques can implement the following flow. In some implementations, an order of the flow, a timing, a functionality and/or components can be modified depending on the device platform being used.

A controller of ListView requests a uniform resource identifier (URI) to be played on a certain TextureView inside a ListView row.

TextureView passes the message to its player thread and starts a texture rendering thread.

The player thread makes multiple video renderers and a single audio renderer and prepares the sample decoder.

When texture thread is ready and the sample decoder is prepared, the video commences playing.

When the playback is nearing the end, the player thread sends a message to the UI thread, requesting that the TextureView switch its rendering texture.

TextureView will send a message to the texture rendering thread and will confirm that it has been executed.

The audio loop will be executed over the ramp period and will now be on the previously prepared MediaCodec instance that was bound to the new active SurfaceTexture.

In some implementations (as described above), the gapless video player can be configured to swap textures. In some implementations, the audio and video tracks associated with a video loop can be maintained in sync on different versions of a media device platform.

The mobile device 120 shown in FIG. 1 is configured to play a looping video file 128 back smoothly over a display 190 to a user. The mobile device 120 includes a network interface 122, one or more processing units 124, memory 126, and a display 190. The network interface 122 includes, for example, Ethernet adaptors, Token Ring adaptors, and the like, for converting electronic and/or optical signals received from a network (not shown) to electronic form for use by the mobile device 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the mobile device 120 can be, or can include processors (e.g., processing units 124) configured to process instructions stored in the memory 126.

Figure 2A:
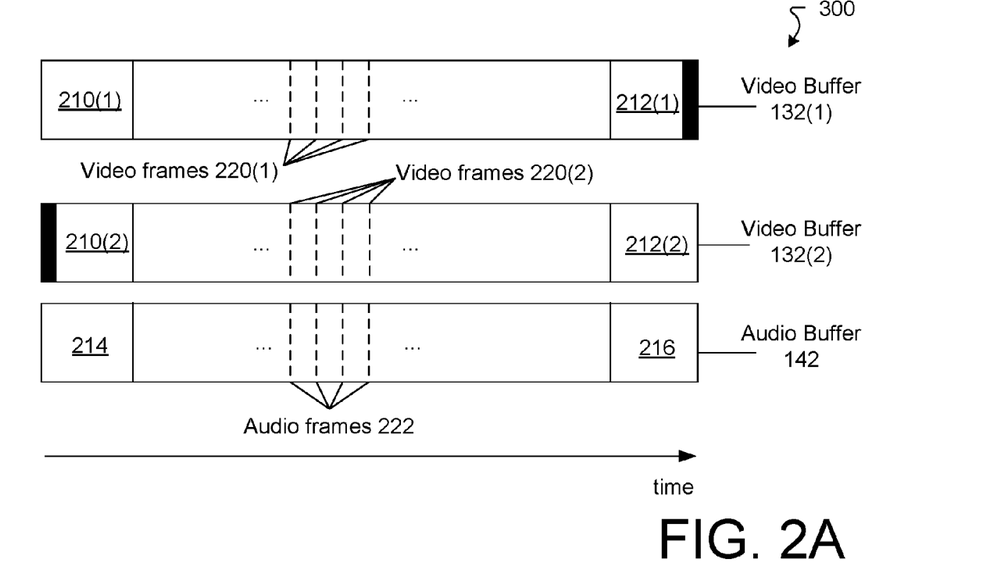
FIGS. 2A and 2B illustrate an example of decoding and rendering video and audio from a video file.
Figure 2B:
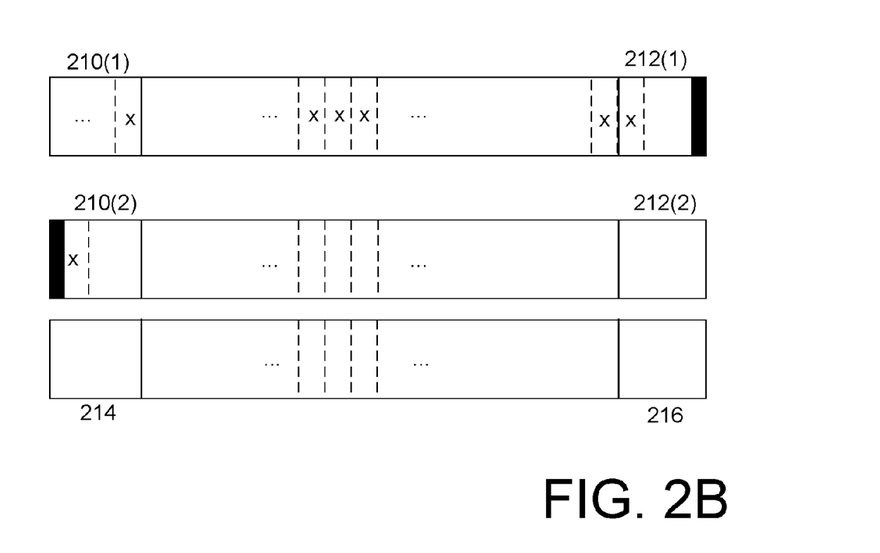

FIGS. 2A and 2B are diagrams showing the video buffers 132(1) and 132(2) and the audio buffer 142, and their respective content as they are output to the mobile device 120 over time. The buffer 132(1) can be referred to as a first buffer and the buffer 132(2) can be referred to as a second buffer. These diagrams illustrate how gapless video playback is achieved according to the above-described improved techniques.

FIG. 2A shows each buffer 132(1), 132(2), and 142 as containing data for the various frames of the looping video. For example, buffer 132(1) stores video frames 220(1) and buffer 132(2) stores substantially identical video frames 220(2). The audio buffer 142 stores audio frames 222. When rendered, these video frames 220(1) and 220(2) and audio frames 222 determine what is output to the display and speaker of the audio device 120 and in what sequence.

As shown in FIG. 2A, the frames 210(1) in the buffer 132(1) (e.g., first buffer) correspond to a beginning portion of a loop of rendered video and the frames 212(1) correspond to an end portion of the loop of the rendered video. Similarly, the frames 210(2) in the buffer 132(2) (e.g., second buffer) correspond to a beginning portion of a new loop of the rendered video and the frames 212(2) correspond to an end portion of the new loop of the rendered video. Finally, the frames 214 in the audio buffer 142 correspond to the beginning portion of the audio content and the frames 216 in the audio buffer 142 correspond to the end portion of the audio content.

The darkened parts at the end of frames 212(1) and at the beginning of frames 210(2) correspond to frames that may be trimmed. Typically, about 50-100 milliseconds of video, i.e., 2 or 3 frames, are trimmed from each of the beginning and end portions.

FIG. 2B shows the same elements as in FIG. 3A except that some of the video frames in buffers 132(1) and 132(2) are labeled with an "x" to denote that they have been rendered for viewing. It should be noted that as the frames corresponding to the end portion, frames 212(1), in the first buffer 132(1) are rendered, the first frame of the second buffer 132(2) is rendered. When the audio is properly synchronized, there will be a smooth, gapless video playback as desired because there is no lag (e.g., no video frames without video content) between rendering the last frame and the first frame of the video.

The audio frames 222 may be matched with corresponding video frames 220(1) and 220(2). Nevertheless, in some implementations there is a cross-fading operation to smooth out any audio transitions between loops. In such implementations, some frames in the portions 212(1) and 210(2) may be trimmed and merged. In this case, time stamps corresponding to audio samples should be adjusted. The adjustment involves assigning timestamps that provide a constant duration to each loop. In some implementations, such an adjustment may involve stretching the time difference between samples, i.e., assigning larger timestamps to the audio samples during the transition.

Figure 3:
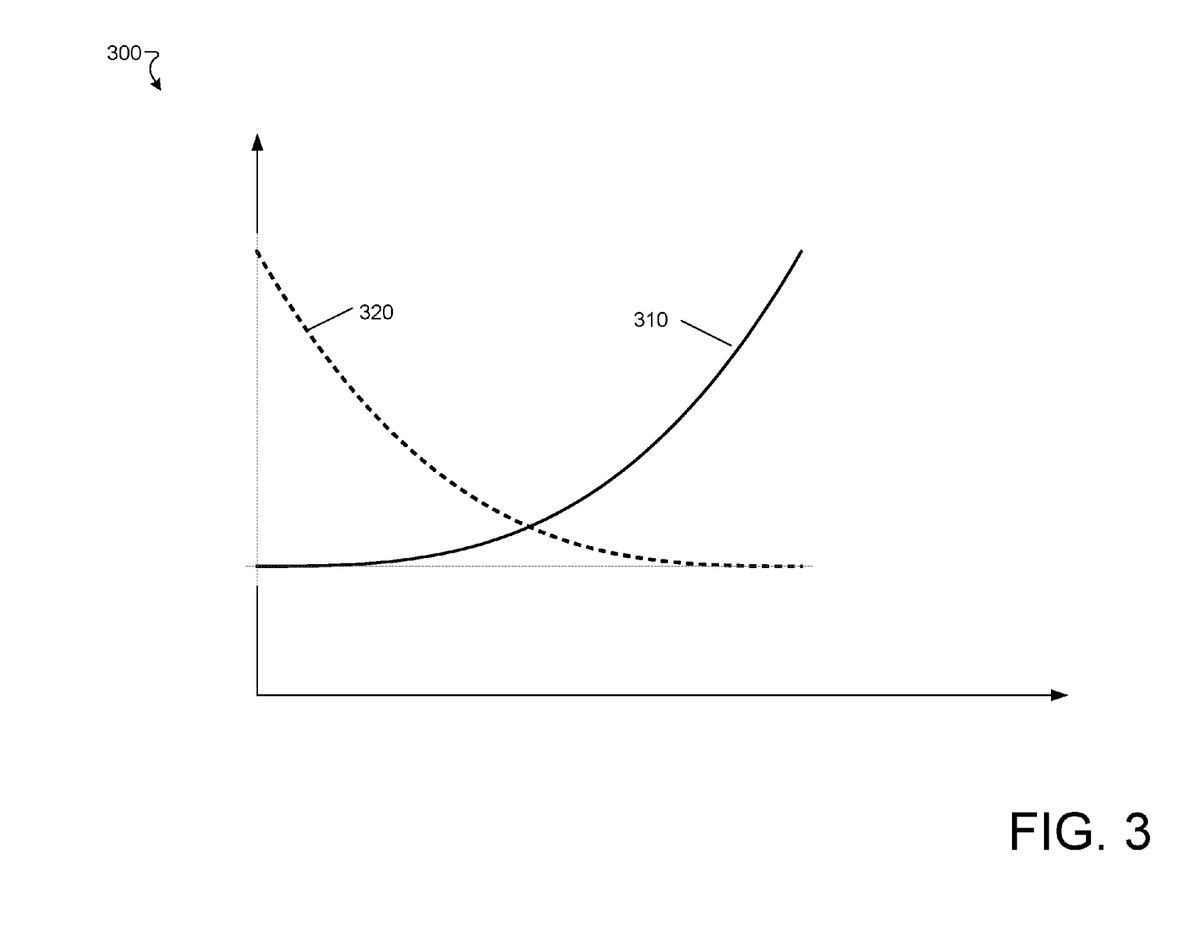
FIG. 3 illustrates an example cross-fading profile.

FIG. 3 shows a graph 300 of an example functional form of the cross-fading during the transition. As discussed above, the cross-fading may have the mathematical form $$v_b f(x) + v_e f(1-x).$$

In other implementations, each of the terms in the above sum may be played in separate channels. In the graph shown in FIG. 3, $f(x)=1+x^3$. Other functions are possible; nevertheless, this particular functional form was found to have a pleasing sound through the transition. Curve 310 corresponds to the first term in the above sum while the curve 320 corresponds to the second curve in the sum.

Figure 4:
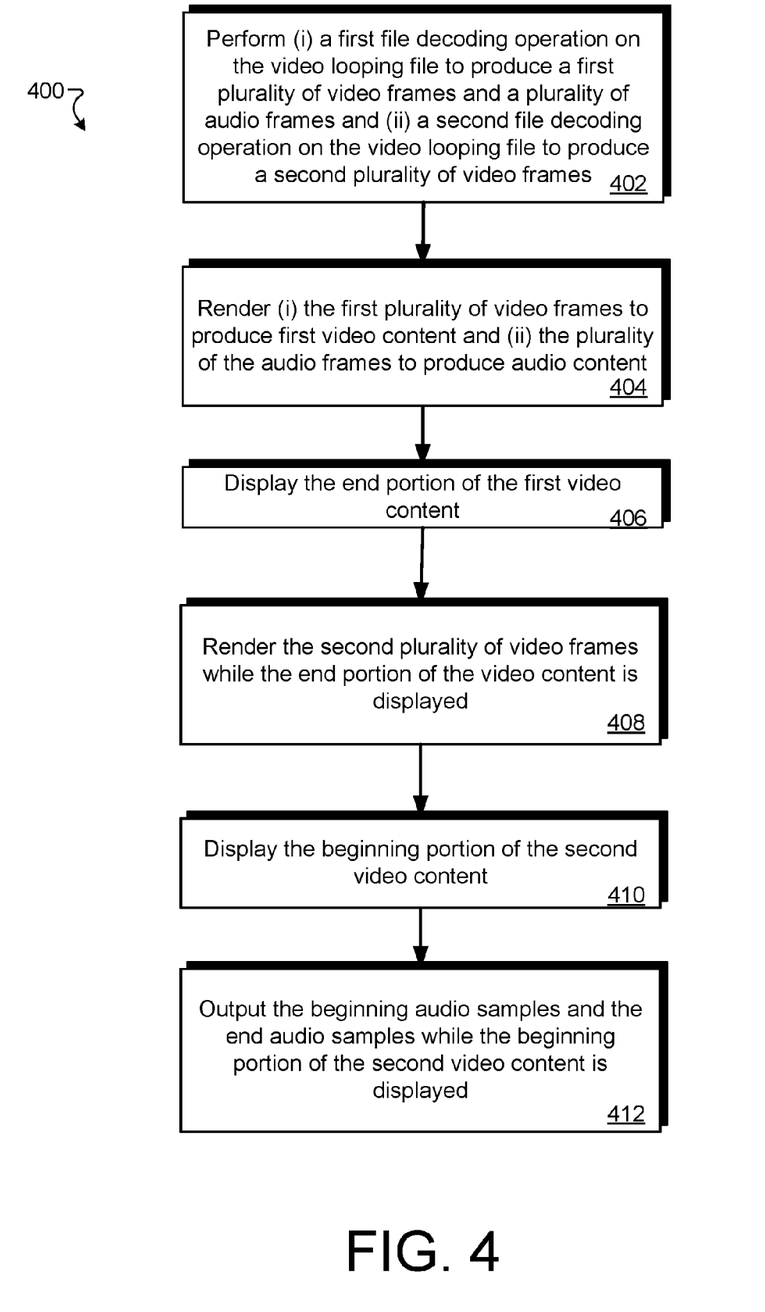
FIG. 4 illustrates a flow chart illustrating an example method of performing an implementation of the improved techniques.

FIG. 4 is a flow chart that illustrates an example method 200 of playing back a looping video file. The method 400 may be performed by constructs described in connection with FIG. 1, which reside in memory 126 of the mobile device 120 and are executed by the processing unit, e.g., a GPU 124.

At 402, a first file decoding operation is performed on the video looping file 128 to produce a first plurality of video frames 134(1) and a plurality of audio frames 144 and a second file decoding operation is performed on the video looping file to produce a second plurality of video frames 134(2). Each of the plurality of audio frames 144 includes audio synchronized with a video frame 134(1) of the first plurality of video frames and the second plurality of video frames 134(2).

At 404, the first plurality of video frames 134(1) is rendered to produce first video content 152, the first video content 152 having a beginning portion and an end portion 154 and the plurality of the audio frames 144 is rendered to produce audio content 156. The audio content 156 includes beginning audio samples 158 corresponding to the beginning portion of the first video content 152 and end audio samples 160 corresponding to the end portion 154 of the first video content 152.

At 406, a display operation is performed to display the end portion 154 of the first video content 152 on e.g., the display 190 (FIG. 1).

At 408, while the end portion 154 of the first video content 152 is being displayed, the second plurality of video frames 134(2) is rendered. The second video content has a beginning portion and an end portion.

At 410, a display operation is performed to display the beginning portion 153 of the second video content on e.g., the display 190.

At 412, while the beginning portion 153 of the second video content is being displayed, the gapless player performs an outputting operation to output beginning audio samples 158 and the end audio samples 160 to, e.g., a speaker of the mobile device 120 (FIG. 1), thereby enabling the looping video file 128 to be played back in a smooth loop.

In FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the mobile device 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the mobile device 120.

The components (e.g., modules, processing units 124) of the mobile device 120 can be configured to operate based on one or more platforms (e.g., one or more similar or different platforms) that can include one or more types of hardware, software, firmware, operating systems, runtime libraries, and/or so forth. In some implementations, the components of the mobile device 120 can be configured to operate within a cluster of devices (e.g., a server farm). In such an implementation, the functionality and processing of the components of the mobile device 120 can be distributed to several devices of the cluster of devices.

The components of the mobile device 120 can be, or can include, any type of hardware and/or software configured to process attributes. In some implementations, one or more portions of the components shown in the components of the mobile device 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the mobile device 120 can be, or can include, a software module configured for execution by at least one processor (not shown). In some implementations, the functionality of the components can be included in different modules and/or different components than those shown in FIG. 1.

Although not shown, in some implementations, the components of the mobile device 120 (or portions thereof) can be configured to operate within, for example, a data center (e.g., a cloud computing environment), a computer system, one or more server/host devices, and/or so forth. In some implementations, the components of the mobile device 120 (or portions thereof) can be configured to operate within a network. Thus, the components of the mobile device 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the color image processing computer 120 can be, or can include, processors configured to process instructions stored in a memor. For example, the video decoding manager 130 (and/or a portion thereof), the audio decoding manager 140 (and/or a portion thereof), the rendering manager 150 (and/or a portion thereof), the video frame trimming manager 170, (and/or a portion thereof), the timestamp adjustment manager 172 (and/or a portion thereof), and the cross-fade manager 180 (and/or a portion thereof) can be a combination of a processor and a memory configured to execute instructions related to a process to implement one or more functions.

Further implementations are summarized in the following examples. The following examples can be include in a system, or in a computer program product comprising a nontransitive storage medium where the computer program product includes code that, when executed by processing circuitry of a sound rendering computer is configured to play back a looping video file and causes the processing circuitry to perform a method.

Example 1

A method of playing back a looping video file can include performing (i) a first file decoding operation on the video looping file to produce a first plurality of video frames and a plurality of audio frames and (ii) a second file decoding operation on the video looping file to produce a second plurality of video frames. Each of the plurality of audio frames can include audio synchronized with a video frame of the first plurality of video frames and a video frame of the second plurality of video frames. The method can include rendering (i) the first plurality of video frames to produce first video content where the first video content has a beginning portion and an end portion and (ii) the plurality of the audio frames to produce audio content. The audio content can include beginning audio samples corresponding to the beginning portion of the first video content and end audio samples corresponding to the end portion of the first video content. The method can include performing a display operation to display the end portion of the first video content. While the end portion of the first video content is being displayed, rendering, by the processing circuitry, the second plurality of video frames, the second video content have a beginning portion and an end portion. The method can include performing the display operation to display the beginning portion of the second video content. While the beginning portion of the second video content is being displayed, performing an output operation to output the beginning audio samples and the end audio samples.

Example 2

The method as in example 1, wherein, the first plurality of video frames includes an end portion corresponding to the end portion of the first video content and the second plurality of video frames includes a beginning portion corresponding to the beginning portion of the second video content.

Example 3

The method as in example 2, further comprising prior to rendering the first plurality of video frames, performing a trimming operation on the end portion of the first plurality of video frames, and prior to rendering the second plurality of video frames, performing the trimming operation on the beginning portion of the second plurality of video frames.

Example 4

The method as in example 3, wherein each of the beginning audio samples and the end audio samples has a respective timestamp.

Example 5

The method as in example 4, wherein performing the trimming operation on the end portion of the first plurality of video frames includes adjusting timestamps of the end audio samples, and wherein performing the trimming operation on the beginning portion of the second plurality of video frames includes adjusting timestamps of the beginning audio samples.

Example 6

The method as in any of examples 1 through 5, wherein outputting the beginning audio samples and the end audio samples includes (i) decreasing a volume of the end audio samples to zero volume as the beginning portion of the second video content is displayed and (ii) increasing a volume of the beginning audio samples from zero volume as the beginning portion of the second video content is displayed.

Example 7

The method as in example 6, wherein decreasing the volume of the end audio samples and increasing the volume of the beginning audio samples includes generating a volume profile of the audio content as the beginning portion of the second video content is displayed, the volume profile being a sum of (i) a product of a minimum volume of the beginning audio samples and a monotonically increasing function of a fraction of the beginning portion of the second video content displayed and (ii) a product of a maximum volume of the end audio samples and an inverse of the monotonically increasing function of the fraction of the beginning portion of the second video content displayed.

Example 8

The method as in example 7, wherein the monotonically increasing function is $f(x)=1+x^3$, where x is a fraction of the beginning portion of the second video content over time.

Example 9

The method as in any of examples 1 through 8, wherein the first plurality of video frames and the second plurality of video frames are each rendered onto a SurfaceTexture within an Android mobile platform.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of playing back a looping video file, the method comprising:
performing (i) a first file decoding operation on the video looping file to produce a first plurality of video frames and a plurality of audio frames and (ii) a second file decoding operation on the video looping file to produce a second plurality of video frames, each of the plurality of audio frames including audio synchronized with a video frame of the first plurality of video frames and a video frame of the second plurality of video frames;
rendering (i) the first plurality of video frames to produce first video content, the first video content having a beginning portion and an end portion and (ii) the plurality of audio frames to produce audio content, the audio content including beginning audio samples corresponding to the beginning portion of the first video content and end audio samples corresponding to the end portion of the first video content;
performing a display operation to display the end portion of the first video content;
while the end portion of the first video content is being displayed, rendering, by the processing circuitry, the second plurality of video frames, the second video content having a beginning portion and an end portion;

performing the display operation to display the beginning portion of the second video content;

while the beginning portion of the second video content is being displayed, performing an output operation to output the beginning audio samples and the end audio samples, the beginning audio samples including a volume profile of the audio content as the beginning portion of the second video content is displayed, the volume profile being a product of a volume of the beginning audio samples and a monotonically increasing function of a fraction of the beginning portion of the second video content displayed.

2. The method as in claim 1, wherein, the first plurality of video frames includes an end portion corresponding to the end portion of the first video content and the second plurality of video frames includes a beginning portion corresponding to the beginning portion of the second video content.

3. The method as in claim 2, further comprising:
prior to rendering the first plurality of video frames, performing a trimming operation on the end portion of the first plurality of video frames; and
prior to rendering the second plurality of video frames, performing the trimming operation on the beginning portion of the second plurality of video frames.

4. The method as in claim 3, wherein each of the beginning audio samples and the end audio samples has a respective timestamp.

5. The method as in claim 4, wherein performing the trimming operation on the end portion of the first plurality of video frames includes adjusting timestamps of the end audio samples, and
wherein performing the trimming operation on the beginning portion of the second plurality of video frames includes adjusting timestamps of the beginning audio samples.

6. The method as in claim 1, wherein outputting the beginning audio samples and the end audio samples includes (i) decreasing a volume of the end audio samples to zero volume as the beginning portion of the second video content is displayed and (ii) increasing a volume of the beginning audio samples from zero volume as the beginning portion of the second video content is displayed.

7. The method as in claim 6, wherein decreasing the volume of the end audio samples and increasing the volume of the beginning audio samples includes generating a volume profile of the audio content as the beginning portion of the second video content is displayed, the volume profile being a sum of (i) a product of a minimum volume of the beginning audio samples and the monotonically increasing function of the fraction of the beginning portion of the second video content displayed and (ii) a product of a maximum volume of the end audio samples and an inverse of the monotonically increasing function of the fraction of the beginning portion of the second video content displayed.

8. The method as in claim 7, wherein the monotonically increasing function is $f(x)=1+x^3$, where x is a fraction of the beginning portion of the second video content over time.

9. The method as in claim 1, wherein the first plurality of video frames and the second plurality of video frames are each rendered onto a SurfaceTexture within an Android mobile platform.

10. The method as in claim 1, wherein the plurality of audio frames, the first plurality of video frames, and the second plurality of video frames are on different versions of a media device platform.

11. A computer program product comprising a nontransitive storage medium, the computer program product including code that, when executed by processing circuitry of a sound rendering computer configured to play back a looping video file, causes the processing circuitry to perform a method, the method comprising:

performing (i) a first file decoding operation on the video looping file to produce a first plurality of video frames and a plurality of audio frames and (ii) a second file decoding operation on the video looping file to produce a second plurality of video frames, each of the plurality of audio frames including audio synchronized with a video frame of the first plurality of video frames and a video frame of the second plurality of video frames;

rendering (i) the first plurality of video frames to produce first video content, the first video content having a beginning portion and an end portion and (ii) the plurality of the audio frames to produce audio content, the audio content including beginning audio samples corresponding to the beginning portion of the first video content and end audio samples corresponding to the end portion of the first video content;

performing a display operation to display the end portion of the first video content;

while the end portion of the first video content is being displayed, rendering, by the processing circuitry, the second plurality of video frames, the second video content having a beginning portion and an end portion;

performing the display operation to display the beginning portion of the second video content;

while the beginning portion of the second video content is being displayed, performing an output operation to output the beginning audio samples and the end audio samples;

wherein performing the output operation to output the beginning audio samples and the end audio samples includes (i) decreasing a volume of the end audio samples to zero volume as the beginning portion of the second video content is displayed and (ii) increasing a volume of the beginning audio samples from zero volume as the beginning portion of the second video content is displayed, and wherein decreasing the volume of the end audio samples and increasing the volume of the beginning audio samples includes generating a volume profile of the audio content as the beginning portion of the second video content is displayed, the volume profile being a sum of (i) a product of a minimum volume of the beginning audio samples and a monotonically increasing function of a fraction of the beginning portion of the second video content displayed and (ii) a product of a maximum volume of the end audio samples and an inverse of the monotonically increasing function of the fraction of the beginning portion of the second video content displayed.

12. The computer program product as in claim 11, wherein, the first plurality of video frames includes an end portion corresponding to the end portion of the first video content and the second plurality of video frames includes a beginning portion corresponding to the beginning portion of the second video content.

13. The computer program product as in claim 12, wherein the method further comprises:
prior to rendering the first plurality of video frames, performing a trimming operation on the end portion of the first plurality of video frames; and prior to rendering the second plurality of video frames, performing the trimming operation on the beginning portion of the second plurality of video frames.

14. The computer program product as in claim 13, wherein each of the beginning audio samples and the end audio samples has a respective timestamp.

15. The computer program product as in claim 14, wherein performing the trimming operation on the end portion of the first plurality of video frames includes adjusting timestamps of the end audio samples, and
wherein performing the trimming operation on the beginning portion of the second plurality of video frames includes adjusting timestamps of the beginning audio samples.

16. The computer program product as in claim 11, wherein the monotonically increasing function is $f(x)=1+x^3$, where x is a fraction of the beginning portion of the second video content over time.

17. The computer program product as in claim 11, wherein the first plurality of video frames and the second plurality of video frames are each rendered onto a SurfaceTexture within an Android mobile platform.

18. A system comprising:
at least one processor; and
memory that stores instructions that, when executed by the at least one processor, cause the system to perform operations of,
performing (i) a first file decoding operation on the video looping file to produce a first plurality of video frames and a plurality of audio frames and (ii) a second file decoding operation on the video looping file to produce a second plurality of video frames, each of the plurality of audio frames including audio synchronized with a video frame of the first plurality of video frames and a video frame of the second plurality of video frames;
rendering (i) the first plurality of video frames to produce first video content, the first video content having a beginning portion and an end portion and (ii) the plurality of the audio frames to produce audio content, the audio content including beginning audio samples corresponding to the beginning portion of the first video content and end audio samples corresponding to the end portion of the first video content;
performing a display operation to display the end portion of the first video content;
while the end portion of the first video content is being displayed, rendering, by the processing circuitry, the second plurality of video frames, the second video content having a beginning portion and an end portion;
performing the display operation to display the beginning portion of the second video content;
while the beginning portion of the second video content is being displayed, performing an output operation to output the beginning audio samples and the end audio samples,
the beginning audio samples including a volume profile of the audio content as the beginning portion of the second video content is displayed, the volume profile being a product of a volume of the beginning audio samples and a monotonically increasing function of a fraction of the beginning portion of the second video content displayed.

19. The system as in claim 18, wherein, the first plurality of video frames includes an end portion corresponding to the end portion of the first video content and the second plurality of video frames includes a beginning portion corresponding to the beginning portion of the second video content.

20. The method as in claim 18, wherein the system is a mobile electronic device.

* * * * *